(12) United States Patent
Yang

(10) Patent No.: US 11,410,566 B2
(45) Date of Patent: Aug. 9, 2022

(54) NETWORK HANDWRITING INSTRUMENT

(71) Applicant: Shaofeng Yang, Beijing (CN)

(72) Inventor: Shaofeng Yang, Beijing (CN)

( * ) Notice: Subject to any disclaimer, the term of this patent is extended or adjusted under 35 U.S.C. 154(b) by 0 days.

(21) Appl. No.: 17/143,857

(22) Filed: Jan. 7, 2021

(65) Prior Publication Data

US 2022/0180760 A1   Jun. 9, 2022

(30) Foreign Application Priority Data

Dec. 8, 2020 (CN) .......................... 202011441988.7

(51) Int. Cl.
*G09B 5/02* (2006.01)
*G09B 5/00* (2006.01)
*G06F 3/0488* (2022.01)

(52) U.S. Cl.
CPC ............. *G09B 5/02* (2013.01); *G06F 3/0488* (2013.01); *G09B 5/00* (2013.01)

(58) Field of Classification Search
CPC ............ G09B 5/02; G09B 5/00; G06F 3/0488
See application file for complete search history.

(56) References Cited

U.S. PATENT DOCUMENTS

| | | | | |
|---|---|---|---|---|
| 2004/0083229 | A1* | 4/2004 | Porter | G09B 7/02 |
| 2005/0178839 | A1* | 8/2005 | Grant | G06F 3/042 |
| | | | | 235/462.08 |
| 2007/0025612 | A1* | 2/2007 | Iwasaki | G06F 3/0421 |
| | | | | 382/154 |

* cited by examiner

*Primary Examiner* — Eddy Saint-Vil
(74) *Attorney, Agent, or Firm* — Wen IP LLC; Zhihua Han

(57) ABSTRACT

The present invention discloses a network handwriting instrument. The network handwriting instrument comprises a handwriting table. A column is fixedly mounted in a middle position of a back side of an upper end surface of the handwriting table. A transverse column is arranged on the upper portion of a front surface of the column. An LED illumination lamp and a camera are arranged on a lower end surface of the transverse column. A horn, a power supply switch, a power supply indicator lamp and a liquid crystal touch screen are fixedly mounted from top to bottom on a lower portion of the front surface of the column, successively. According to the network handwriting instrument, a heating plate is heated up through an electric heating wire, so that the network handwriting instrument is used in winter conveniently. As the camera is focused on writing paper to shoot, so that a user can be interacted with a teacher online in real time. Meanwhile, the network handwriting instrument can record a writing process online in real time, and it is unnecessary to take a picture by a mobile phone to upload a class assignment. The LED illumination lamp and the camera are mounted in a hidden manner through formed mounting slots and dustproof plates are mounted at openings of the mounting slots to protect the LED illumination lamp and the camera so as to prevent the LED illumination lamp and the camera from being damaged by collision and to prevent dust from entering the network handwriting instrument.

10 Claims, 5 Drawing Sheets

NETWORK HANDWRITING INSTRUMENT

TECHNICAL FIELD

The present invention relates to the technical field of network education, in particular to a network handwriting instrument.

BACKGROUND

In some files introduced by Ministry of Education, modern network education is also called distance education, which is one of adult education histories. In an epidemic period, primary and secondary school students learn by means of network classes, too, which is a teaching mode using communications media such as televisions and Internet. The teaching mode breaks through a spatiotemporal boundary line and is different from a conventional board-at-school teaching mode. At present, subject network education is quite developed. Synchronous practice along with the class is very important while teachers impart knowledge and the understanding of knowledge points by students is mastered timely, and the knowledge points in the class can be better deepened and consolidated, so that teachers can see the writing processes of the students in real time and correct errors timely and interact and answer questions timely to develop good writing and learning habits of the students in an assisted manner. It is suitable for all subjects. The writing processes of the students are synchronized in real time, so that the class interaction link is increased, thereby avoiding a problem that the students are absent-minded in the network classes better. At present, the network is quite developed and it is unnecessary to go to special locations to attend the class, so that the students can attend the class anytime and anywhere.

However, a special device for network education is lacked nowadays. The students usually learn by using mobile phones and computers, which is inconvenient to operate. Sometimes, it is necessary to shoot and upload the class assignment through the mobile phones, which is quite inconvenient to operate.

SUMMARY

The present invention aims to provide a network handwriting instrument to solve the problems that in the prior art, the special device for network education is lacked nowadays, the students usually learn by using mobile phones and computers, which is inconvenient to operate, and sometimes, it is necessary to shoot and upload the class assignment through the mobile phones, which is quite inconvenient to operate.

In order to achieve the purpose, the present invention provides a technical scheme as follows: the network handwriting instrument includes a handwriting table. A column is fixedly mounted in a middle position of a back side of an upper end surface of the handwriting table. A transverse column is arranged on the upper portion of a front surface of the column. An LED illumination lamp and a camera are arranged on a lower end surface of the transverse column. A horn, a power supply switch, a power supply indicator lamp and a liquid crystal touch screen are fixedly mounted from top to bottom on a lower portion of the front surface of the column, and a controller is arranged in the column and the controller is electrically connected to one end of an electronic connecting wire.

Preferably, an anti-skid pad is fixedly mounted on a lower end surface of the handwriting table, a heating plate is fixedly mounted on the upper end surface of the handwriting table, an electric heating wire is fixedly mounted between the handwriting table and the heating plate, the handwriting table is made from a PVC material, the heating plate is made from a timber, a storage tank is arranged on the front surface of the column, the transverse slot is movably formed in the inner side of a damping rotating shaft, a mounting slot I is formed in the lower end surface of the transverse column, the LED illumination lamp is fixedly mounted in the mounting slot I, a mounting slot II is formed in the front side of the bottom of the transverse column, and the camera is fixedly mounted in the mounting slot II.

Preferably, a mounting slot III is formed in the front surface of the column and the horn is fixedly mounted in the mounting slot III in an embedded manner.

Preferably, a mounting slot IV is formed in the front surface of the column and the power supply indicator lamp is fixedly mounted in the mounting slot IV in an embedded manner.

Preferably, a mounting slot V is formed in the front surface of the column, the liquid crystal touch screen is fixedly mounted in the mounting slot V in an embedded manner, the controller is fixedly mounted in the mounting slot V and the controller is internally provided with an Android system and an intelligent chip.

Preferably, the controller is electrically connected to one end of the electronic connecting wire and the other end of the electronic connecting wire is fixedly connected to a power supply plug.

Preferably, dustproof plates are fixedly mounted at openings of the mounting slot I and the mounting slot II, the dustproof plates being made from a glass material and the lower end surfaces of the dustproof plates being aligned with the openings of the mounting slot I and the mounting slot II.

Preferably, the electric heating wire is in a snakelike distribution.

Preferably, the anti-skid pad is made from a rubber material and the bottom of the anti-skid pad is provided with anti-skid sliding points.

Preferably, the height of the storage tank is greater than the length of the transverse column and a dustproof cover is mounted at the upper end of the storage tank in a clamped manner.

Compared with the prior art, the present invention has the beneficial effects:

1. According to the network handwriting instrument, the electrical heating wire is fixedly mounted between the handwriting table and the heating plate, the handwriting table is made from a timber, and the PCV material is lighter, so that the integral weight is reduced; the heating plate is heated up through the electric heating wire, so that the network handwriting instrument is used in winter conveniently, and the using comfort level is improved. A temperature control function is achieved by controlling resistance of the electrical heating wire. As the camera is focused on writing paper to shoot and a shot picture is sent by a controller, so that a user can be interacted with a teacher online in real time. Meanwhile, the network handwriting instrument can record a writing process online in real time, and it is unnecessary to take a picture by a mobile phone to upload a class assignment;

2. According to the network handwriting instrument, the LED illumination lamp and the camera are mounted in a hidden manner through formed mounting slots and dustproof plates are mounted at openings of the mounting slots.

The dustproof plates are made from transparent glass materials and the lower end surfaces of the dustproof plates are aligned with the openings of the mounting slot I and the mounting slot II. The LED illumination lamp and the camera are protected by the dustproof plates and are prevented from being damaged by collision and meanwhile, the dustproof plates can prevent dust from entering the network handwriting instrument.

DETAILED DESCRIPTION

Clear and intact description will be made on technical schemes in the embodiments of the present invention below in combination with drawings in the embodiments of the present invention. Obviously, the described embodiments are merely a part of embodiments of the present invention and are not all the embodiments. Based on the embodiments in the present invention, all other embodiments obtained by those skilled in the art without creative efforts shall fall within the protection scope of the present invention.

Figure 1:
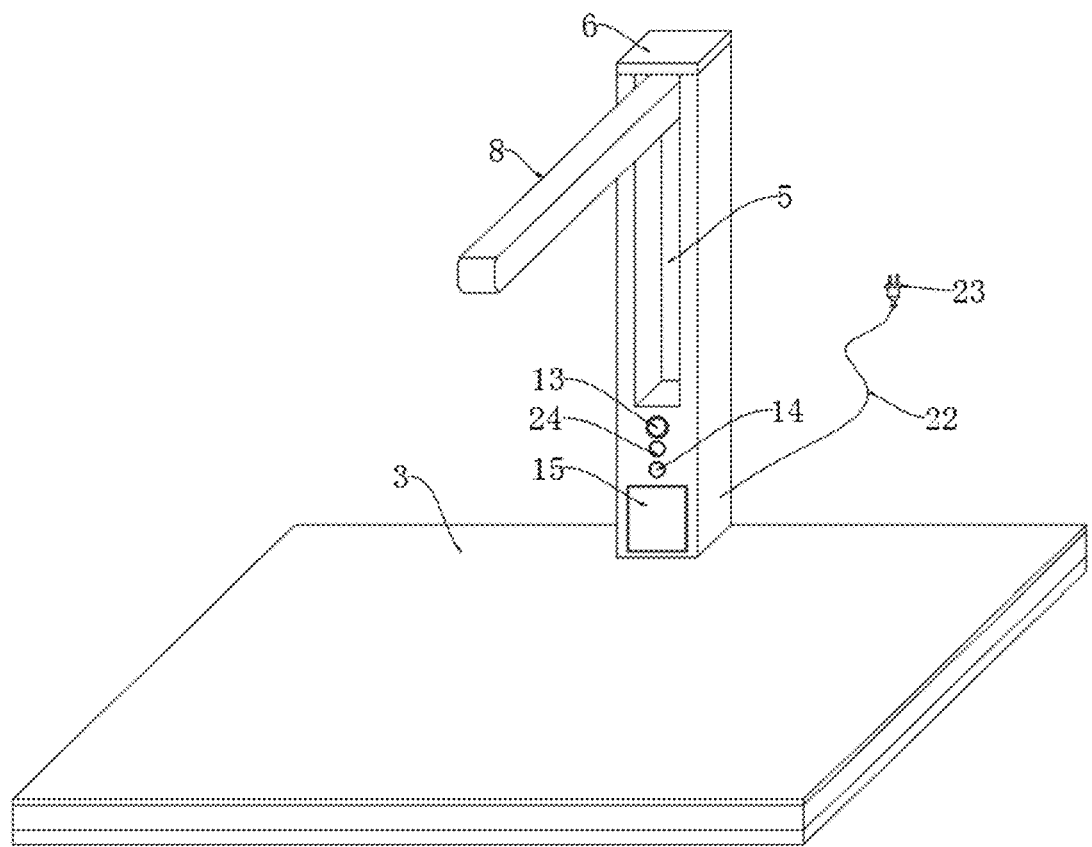
FIG. 1 is a schematic diagram of a three-dimensional structure of the present invention.
Figure 2:
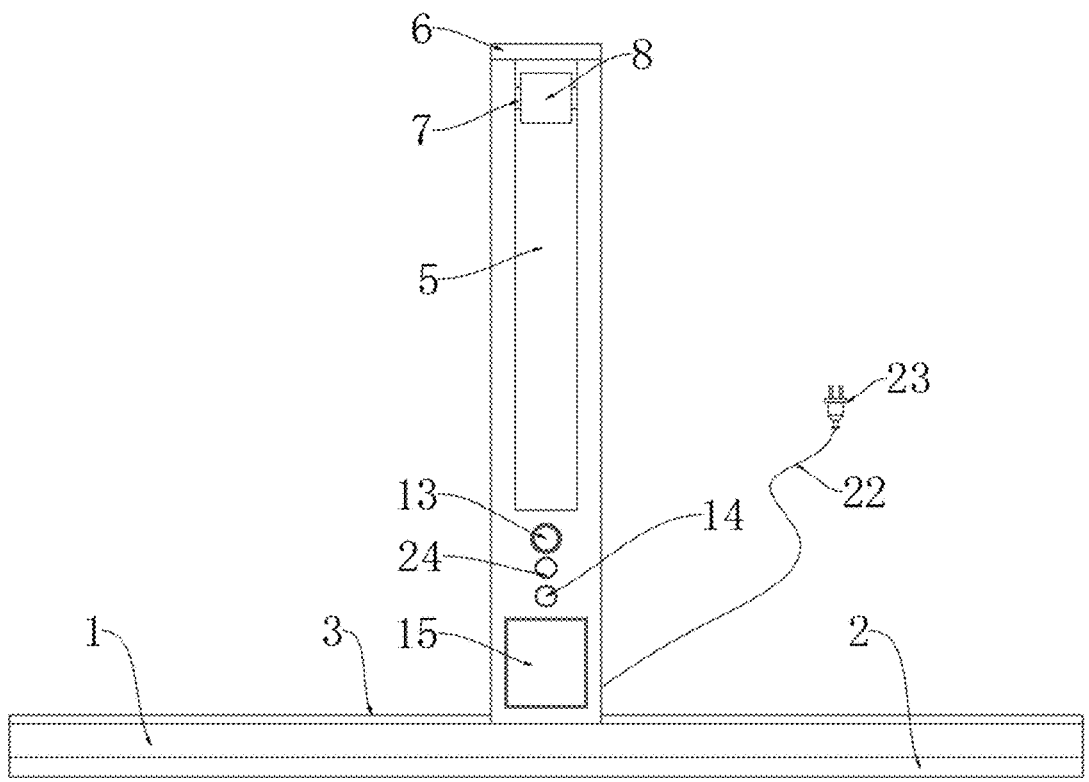
FIG. 2 is a schematic diagram of a front view structure of the present invention.
Figure 3:
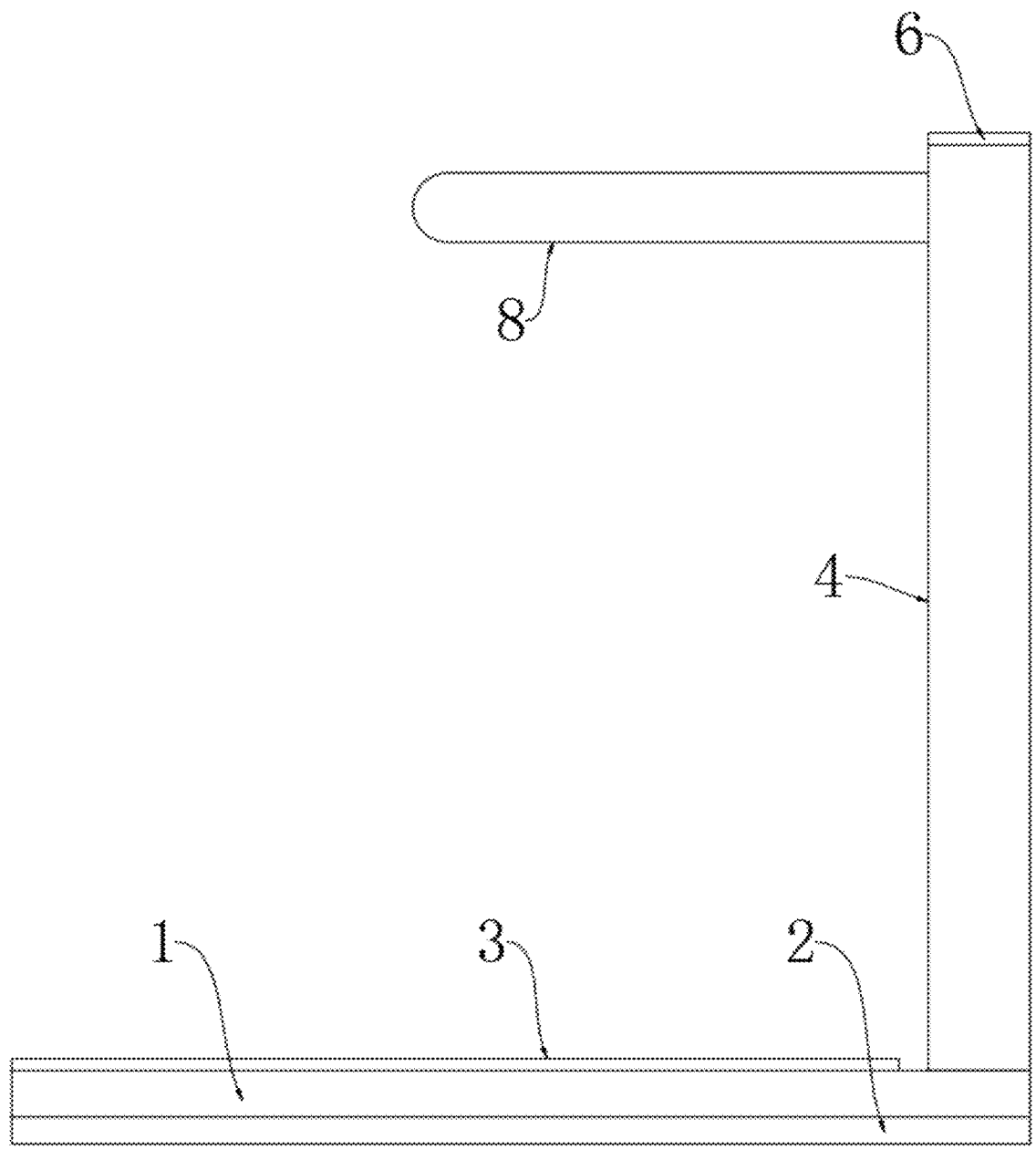
FIG. 3 is a schematic diagram of a side view structure of the present invention.
Figure 4:
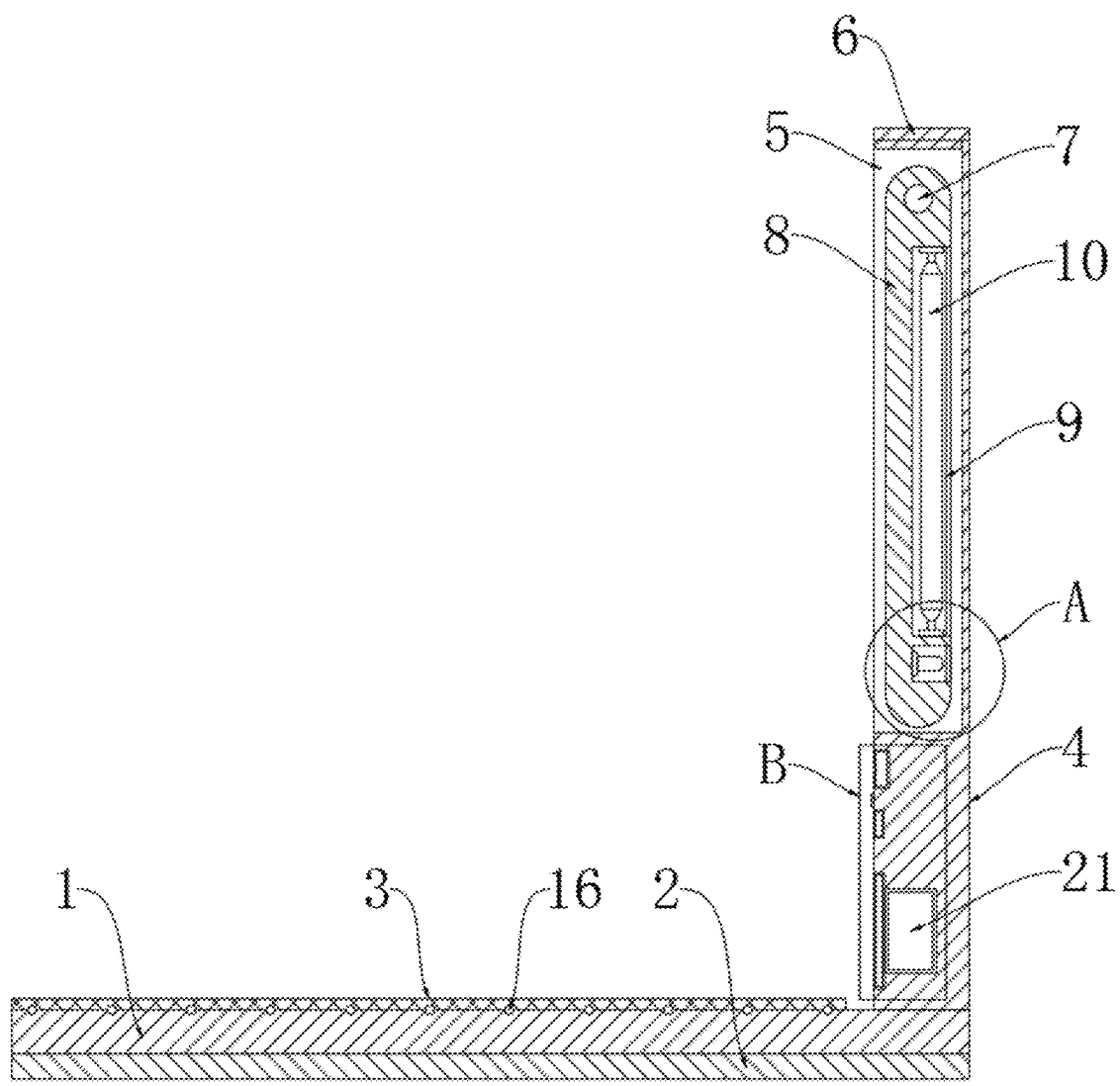
FIG. 4 is a schematic diagram of a side sectional structure of the present invention.
Figure 5:
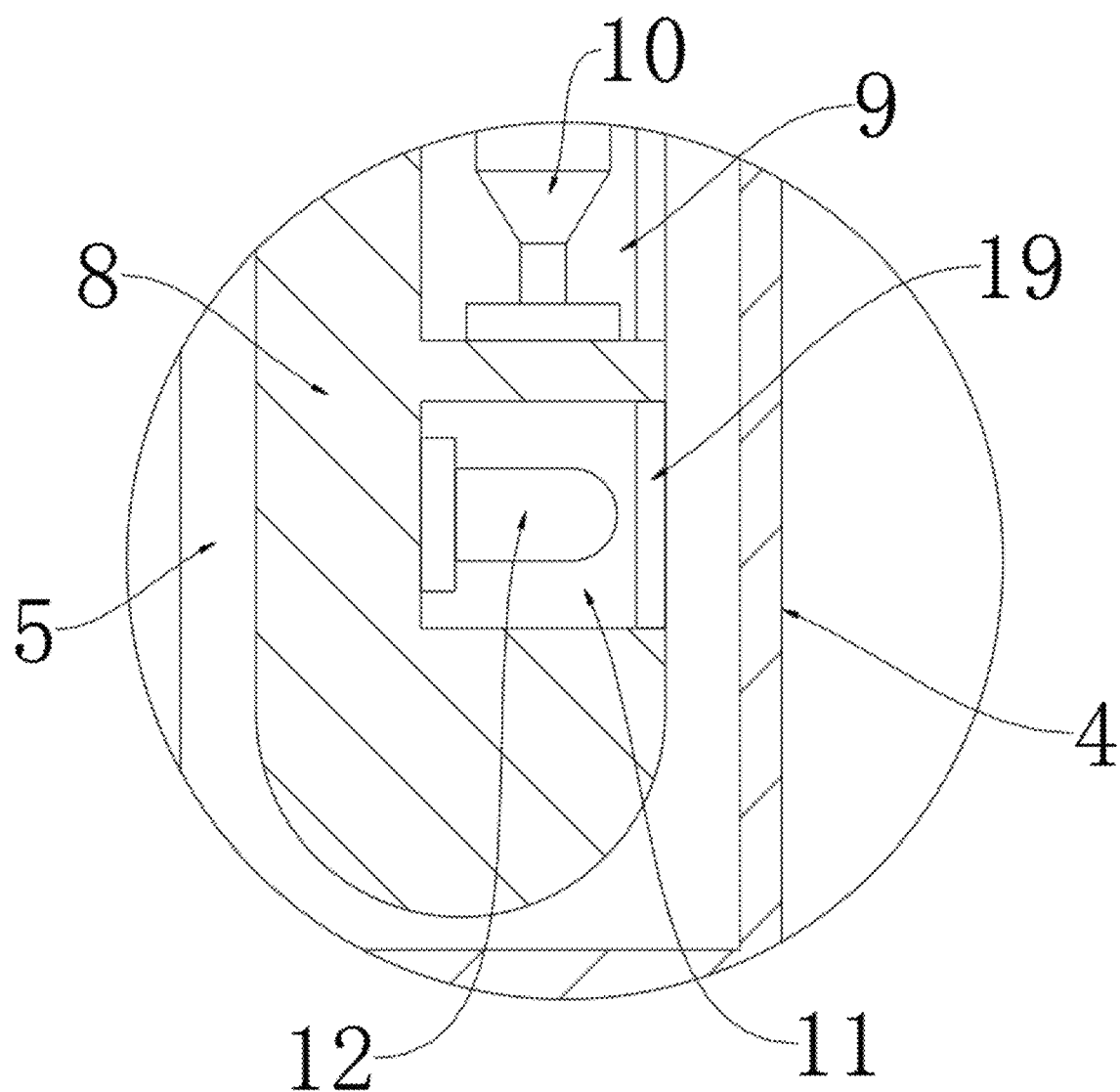
FIG. 5 is a schematic diagram of an amplified structure of A in the FIG. 4.
Figure 6:
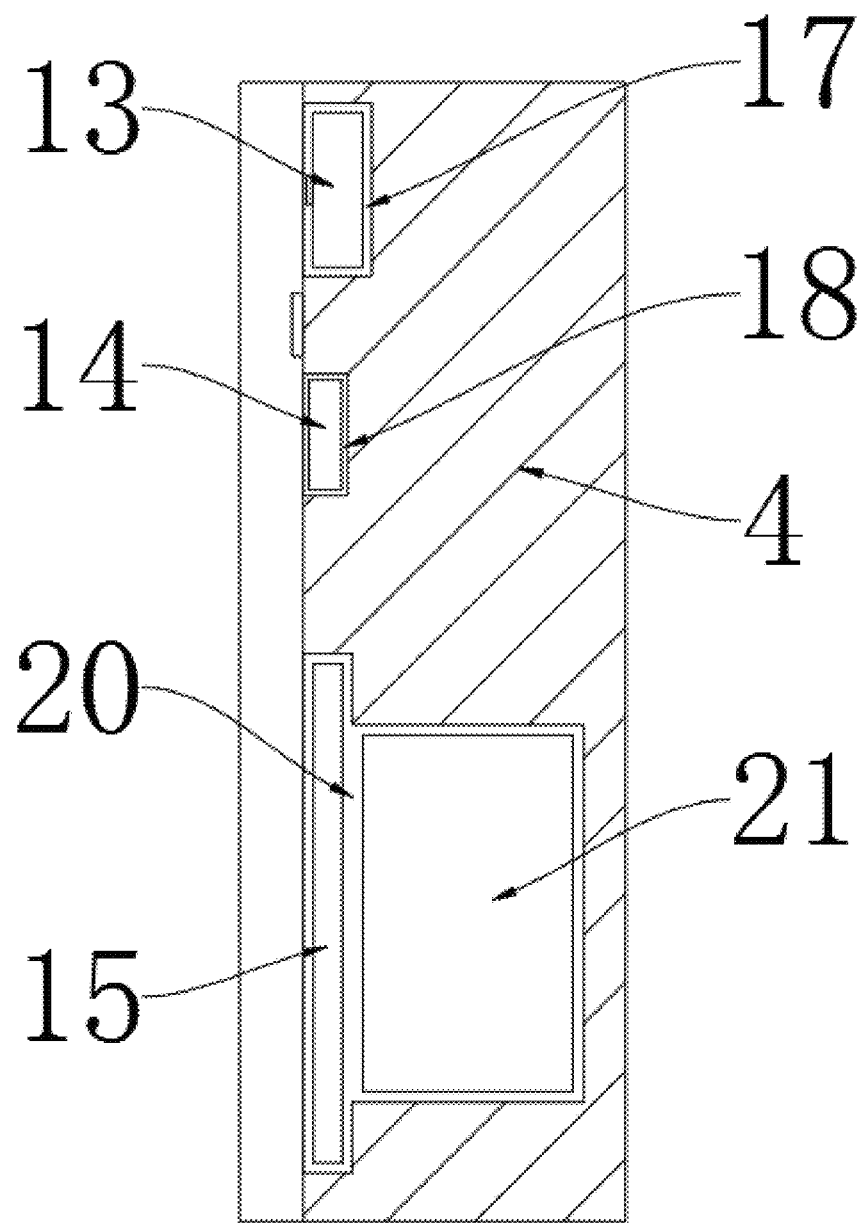
FIG. 6 is a schematic diagram of an amplified structure of B in the FIG. 4.
In the FIG. 1, handwriting table; 2, anti-skid pad; 3, heating plate; 4, column; 5, storage tank; 6, dustproof cover; 7, damping rotating shaft; 8, transverse column; 9, mounting slot I; 10, LED illumination lamp; 11, mounting slot II; 12, camera; 13, horn; 14, power supply indicator lamp; 15, liquid crystal touch screen; 16, electrical heating wire; 17, mounting slot III; 18, mounting slot IV; 19, dustproof plate; 20, mounting slot V; 21, controller; 22, electronic connecting wire; 23, power supply plug; 24, power supply switch.

With reference to FIGS. 1-6, the present invention provides a technical scheme as follows: the network handwriting instrument includes a handwriting table 1. A column 4 is fixedly mounted in a middle position of a back side of an upper end surface of the handwriting table 1. A transverse column 8 is arranged on the upper portion of a front surface of the column 4. An LED illumination lamp 10 and a camera 12 are arranged on a lower end surface of the transverse column 8. A horn 13, a power supply switch 24, a power supply indicator lamp 14 and a liquid crystal touch screen 15 are fixedly mounted from top to bottom on a lower portion of the front surface of the column 4, successively. The controller 21 is electrically connected to one end of an electronic connecting wire 22. An anti-skid pad 2 is fixedly mounted on a lower end surface of the handwriting table 1, a heating plate 3 is fixedly mounted on the upper end surface of the handwriting table 1, an electric heating wire 16 is fixedly mounted between the handwriting table 1 and the heating plate 3, the handwriting table 1 is made from a PVC material, the heating plate 3 is made from a timber, a storage tank 5 is arranged on the front surface of the column 4, a transverse column 8 is movably mounted in the inner side of the storage tank 5 through a damping rotating shaft 7, a mounting slot I 9 is formed in the lower end surface of the transverse column 8, the LED illumination lamp 10 is fixedly mounted in the mounting slot I 9, a mounting slot II 11 is formed in the front side of the bottom of the transverse column 8, and the camera 12 is fixedly mounted in the mounting slot II 11. The PCV material is lighter, so that the integral weight is reduced; the heating plate 3 is heated up through the electric heating wire 16, so that the network handwriting instrument is used in winter conveniently, and the using comfort level is improved. A temperature control function is achieved by controlling resistance of the electrical heating wire 16. The power supply switch 24 is electrically connected to the controller 21;

The mounting slot III 17 is formed in the front surface of the column 4 and the horn 13 is fixedly mounted in the mounting slot III 17 in an embedded manner, so that it is convenient to mount the horn 13 in the embedded manner. A prompt tone is produced by means of the arranged horn 13. The horn 13 further includes a microphone for voice communication conveniently. The mounting slot IV 18 is formed in the front surface of the column 4, and the power supply indicator lamp 14 is fixedly mounted in the mounting slot IV 18 in the embedded manner, so that it is convenient to mount the power supply indicator lamp 14. Whether a power supply is connected or not is displayed by means of the arranged power supply indicator lamp 14;

The mounting slot V 20 is formed in the front surface of the column 4, the liquid crystal touch screen 15 is fixedly mounted in the mounting slot V 20 in an embedded manner, the controller 21 is fixedly mounted in the mounting slot V 20 and the controller 21 is internally provided with an Android system and an intelligent chip. A communication module or a wifi connection module is further fixedly mounted in the mounting slot V 20 for network connection. The controller 21 is electrically connected to the LED illumination lamp 10, the camera 12, the horn 13, the power supply indicator lamp 14, the liquid crystal touch screen 15 and the electrical heating wire 16 for control conveniently;

the controller 21 is electrically connected to one end of the electronic connecting wire 22 and the other end of the electronic connecting wire 22 is fixedly connected to a power supply plug 23, the power supply plug 23 is connected to an external power supply, the dustproof plates 19 are fixedly mounted at openings of the mounting slot I 9 and the mounting slot II 11, the dustproof plates 19 is made from a glass material and the lower end surfaces of the dustproof plates 19 are aligned with the openings of the mounting slot I 9 and the mounting slot II 11. The LED illumination lamp 10 and the camera 12 are protected by the dustproof plates 19 and are prevented from being damaged by collision and meanwhile, the dustproof plates can prevent dust from entering the network handwriting instrument;

The electrical heating wire 16 is in snake-like distribution, so that the electrical heating wire heats more uniformly. The anti-skid pad 2 is made from a rubber material and the bottom of the anti-skid pad 2 is provided with anti-skid protruding points, so that the anti-skid effect is improved. The height of the storage tank 5 is greater than the length of the transverse column 8 and a dustproof cover 6 is mounted at the upper end of the storage tank 5 in a clamped manner. It is convenient to store the transverse column 8 through the arranged storage tank 5.

The working principle is as follows: first, the network handwriting instrument is placed on a desktop integrally, then the power supply plug 23 is plugged into a socket, and at the moment, the power supply indicator lamp 14 is turned on, then the user pulls the transverse column 8 outward, the transverse column 8 rotates through the damping rotating shaft 7 till the LED illumination lamp 10 faces downward, then the user turns on the LED illumination lamp 10 and the camera 12 by the liquid crystal touch screen 15, the LED illumination lamp 10 replaces a table lamp, and as the camera 12 is focused on the writing paper to shoot, and the shot picture can be sent by the controller 31, so that the user can be interacted with the teacher online in real time. Meanwhile, the network handwriting instrument can record the writing process online in real time, and it is unnecessary to take a picture by a mobile phone to upload a class assignment. When the network handwriting instrument is used in winter, the user can turn on the electrical heating wire 16 by touching the liquid crystal touch screen 15 to heat up the heating plate 3, so that the network handwriting instrument is used conveniently in winter and the using comfort level is improved. The temperature control function is achieved by controlling resistance of the electrical heating wire 16. Meanwhile, the height of the storage tank 5 is greater than the length of the transverse column 8. It is convenient to store the transverse column 8 through the arranged storage tank 5. The network handwriting instrument is stable in integral structure and convenient to use.

Finally, it should be noted that the above content is merely used for describing the technical schemes of the present invention and is not intended to limit the protection scope of the present invention. Simple modifications or equivalent substitutions of the technical schemes of the present invention are made by those skilled in the art without departing from the spirit and scope of the present invention.

The invention claimed is:

1. A network handwriting instrument, comprising a handwriting table (1), characterized in that a column (4) is fixedly mounted in a middle position of a back side of an upper end surface of the handwriting table (1), a transverse column (8) is arranged on an upper portion of a front surface of the column (4), an LED illumination lamp (10) and a camera (12) are arranged on a lower end surface of the transverse column (8), a horn (13), a power supply switch (24), a power supply indicator lamp (14) and a liquid crystal touch screen (15) are fixedly mounted from top to bottom on a lower portion of the front surface of the column (4), successively, a controller (21) is arranged in the column (4) and the controller (21) is electrically connected to one end of an electronic connecting wire (22).

2. The network handwriting instrument according to claim 1, characterized in that an anti-skid pad (2) is fixedly mounted on a lower end surface of the handwriting table (1), a heating plate (3) is fixedly mounted on the upper end surface of the handwriting table (1), an electric heating wire (16) is fixedly mounted between the handwriting table (1) and the heating plate (16), the handwriting table (1) is made from a PVC material, the heating plate (3) is made from a timber, a storage tank (5) is arranged on the front surface of the column (4), the transverse slot (5) is movably formed in the inner side of a damping rotating shaft (7), a mounting slot I (9) is formed in the lower end surface of the transverse column (8), the LED illumination lamp (10) is fixedly mounted in the mounting slot I (9), a mounting slot II (11) is formed in the front side of the bottom of the transverse column (8), and the camera (12) is fixedly mounted in the mounting slot II (11).

3. The network handwriting instrument according to claim 2, characterized in that dustproof plates (19) are fixedly mounted at openings of the mounting slot I (9) and the mounting slot II (11), the dustproof plates (19) being made from a glass material and the lower end surfaces of the dustproof plates (19) being aligned with the openings of the mounting slot I (9) and the mounting slot II (11).

4. The network handwriting instrument according to claim 2, characterized in that the electric heating wire (16) is in a snakelike distribution.

5. The network handwriting instrument according to claim 2, characterized in that the anti-skid pad (2) is made from a rubber material and the bottom of the anti-skid pad (2) is provided with anti-skid protruding points.

6. The network handwriting instrument according to claim 2, characterized in that the height of the storage tank (5) is greater than the length of the transverse column (8) and a dustproof cover (6) is mounted at the upper end of the storage tank (5) in a clamped manner.

7. The network handwriting instrument according to claim 1, characterized in that a mounting slot III (17) is formed in the front surface of the column (4) and the horn (13) is fixedly mounted in the mounting slot III (17) in an embedded manner.

8. The network handwriting instrument according to claim 1, characterized in that a mounting slot IV (18) is formed in the front surface of the column (4) and the power supply indicator lamp (14) is fixedly mounted in the mounting slot IV (18) in an embedded manner.

9. The network handwriting instrument according to claim 1, characterized in that a mounting slot V (20) is formed in the front surface of the column (4), the liquid crystal touch screen (15) is fixedly mounted in the mounting slot V (20) in an embedded manner, the controller (21) is fixedly mounted in the mounting slot V (20) and the controller (21) is internally provided with an Android system and an intelligent chip.

10. The network handwriting instrument according to claim 1, characterized in that the other end of the electronic connecting wire (22) is fixedly connected to a power supply plug (23).

* * * * *